United States Patent [19]
Graff et al.

[11] Patent Number: 5,094,011
[45] Date of Patent: Mar. 10, 1992

[54] METHOD AND APPARATUS FOR CONVEYING DRIED PLASTIC GRANULATES

[76] Inventors: Roderich W. Graff, 607 Church St., Ann Arbor, Mich. 48104; Achim H. Becker, Mauerstrasse 5, 6100 Darmstadt, Fed. Rep. of Germany

[21] Appl. No.: 579,936

[22] Filed: Sep. 7, 1990

[30] Foreign Application Priority Data

Sep. 8, 1989 [DE] Fed. Rep. of Germany ....... 3929898

[51] Int. Cl.⁵ .............................................. F26B 3/08
[52] U.S. Cl. ............................................ 34/10; 34/32; 34/57 R; 34/80
[58] Field of Search ................ 34/32, 57 A, 57 R, 80, 34/191, 77, 175, 10; 432/96, 100, 101

[56] References Cited

FOREIGN PATENT DOCUMENTS 2742297 3/1979 Fed. Rep. of Germany .
2354745 9/1985 Fed. Rep. of Germany .

OTHER PUBLICATIONS

Roderich W. Gräff, Maschinenmarkt, Vogel-Verlag, Würzburg, Heft 90 vom 11. Nov. 1975.
Mobile Dryer-Type MD120, Labotek A/S, Frederikssund, Denmark, 1927.

*Primary Examiner*—Henry A. Bennett
*Attorney, Agent, or Firm*—Michael J. Striker

[57] ABSTRACT

A method of and an apparatus for drying plastic granulates in which the drying process is intermittently interrupted and dried plastic granulates are conveyed by a conveying medium during preset time periods which are short with respect to the periods of drying the plastic granulates within a drying container.

19 Claims, 1 Drawing Sheet

METHOD AND APPARATUS FOR CONVEYING DRIED PLASTIC GRANULATES

BACKGROUND OF THE INVENTION

The invention refers to a method for conveying plastic granulates.

German Offenlegungsschrift 2,742,297 discloses a drying container into which granulates to be dried are fed. Dried air is also fed to the drying container, which is passed through the granulates in a counterflow for drying the granulates. The moisture carried with the exhaust air from the drying container is removed from the exhaust air outside the drying container. A portion of the dried air to be fed to the drying container is utilized for conveying the dried granulates discharged from the drying container to a place of subsequent processing, e.g. a feeder for a barrel extruder.

This type of conveying the dried granulates has disadvantages in a number of aspects. Firstly, a portion of the dried air is continuously withdrawn from the otherwise closed loop of the stream of air, comprising the drying container and a device for removing moisture from the air. Therefore, a corresponding replacement portion of fresh air has to be introduced into said loop which results in additional load for the moisture adsorbing material within the exhaust air drying device. Secondly, the throughput of air through said closed loop has to be greater than necessary for drying the granulates within the drying container. This means a higher conveying demand for the blower included in said loop. This leads to a bulky overall apparatus and to waste of energy.

The company Laboratorie-Teknik, Frederikssund, Denmark distributes a drying container for drying granulates by dried air with a designation MDD 120. This device allows conveying dried plastic granulates from the drying container to a subsequent processing machine by a portion of the dried air which is continuously withdrawn form the closed loop of air and re-fed to said loop after conveying of the dried granulates has been effected. This device needs a blower for a greater air throughput than necessary for drying the granulates within the drying container.

German Patent Specification 2,354,745 discloses a method for drying plastic granulates. The drying process of the granulates is interrupted for regenerating the moisture adsorption material contained within a device for removing moisture from the exhaust air of the drying container. The time period for regenerating the adsorption material lasts usually for a approximately a quarter of an hour. For carrying out this method a reversible blower and a number of flap valves are necessary for alternatingly drying the plastic granulates and regenerating the adsorption material.

The "Maschinenmarkt" dated Nov. 1, 1975, published by Vogel, Würzburg, West-Germany discloses a so-called Hot Air Dryer, through which hot air is passed in counterflow through plastic granulates sinking through the dryer. The granulates are heated and dried by the hot air. A blower is provided for drawing in air from the atmosphere or exhaust air from said dryer which is heated by heating means to the desired temperature before being fed into the dryer.

SUMMARY OF THE INVENTION

It is therefore an object underlying the invention to provide an improved method for drying plastic granulates and for conveying the dried granulates to subsequent processing site. It is yet another object underlying the invention to provide a method for drying plastic granulates and for conveying the dried granulates to a subsequent processing machine which avoids waste of energy. Moreover, according to yet another object of invention a method for drying plastic granulates and for conveying the dried granulates is to be provided which may be carried our with an inexpensive apparatus. The improved method for drying granulates and conveying dried granulates should also offer the possibility to feed granulates to be dried to the drying container.

The objects of the invention are achieved with a method for drying plastic granulates in a drying container, comprising the steps of feeding granulates to be dried into the drying container, and passing dried air in counterflow through the granulates fed into the drying container and sinking there through for drying the granulates therein, and wherein the feed of dried air to the drying container is intermittently interrupted interval, for a short time and the dried granules are conveyed during said interval. Extended research has revealed that short time interruptions of the drying process for 5 through 10 seconds, e.g., will not adversely affect the process of heating and drying the granulates, and, on the other hand, will suffice to convey batches of granulates. Thereby, batches of granulates may be conveyed from a stock of granulates to the drying container. Also, batches of dried granulates may be conveyed during the fixed short time interruptions of the drying process from the drying container to a site of further processing.

The invention may be utilized advantageously with hot air drying containers as well as with dried air drying containers.

The time period of contact between the conveying medium like gas or air and the dried warm granulates is very short. Therefore, the dried granulates will adsorb practically no moisture from the conveying medium. Thus, the conveying medium may normally be the exhaust air from the drying container, or may be air from atmosphere. Under circumstances when the dried granulates are extremely sensitive to moisture, the conveying medium may be dried gas or dried air.

The invention provides for the particular improvement of controlling the number of interruptions in dependence from the filling level within a feeding hopper and/or within the drying container.

According to a particularly preferred embodiment of the invention, the dried granulates are kept in readiness for being conveyed during an interruption of the drying process, within a space the volume of which may be variable. Thereby, the quantity of plastic granulates to be conveyed may vary.

The invention provides also for an apparatus specifically adapted to carry out the method according to the invention. The apparatus includes a drying container having a granulate discharge end and having an exhaust air outlet opposite to the granulate discharge end, and having a dried air inlet within its interior and in the vicinity of the granulate discharge end. The apparatus further comprises a blower the suction port of which is coupled to the exhaust air outlet. The pressure port of the blower is coupled to a heating means which is connected to the dried air outlet. Between the pressure port and the heating means, a device for removing moisture from the exhaust air may be provided. Particularly, an input of a first control valve is connected to the pressure port of the blower. A first output of the first control valve is coupled to the heating means, and a second output of the first control valve is coupled to a conveying conduit into which a discharge conduit from the discharge end of the drying container opens. Moreover, the suction port of the blower is connected to a first output of a second control valve. Said second control valve has an input which may be shut off. Thus, the apparatus for carrying out the method according to invention only needs two simple valves over what is commonly held necessary. The apparatus according to the invention is specifically adapted to convey the dried granulates by gas, preferably air. Additionally, the apparatus according to the invention allows to sweep the space which contains the granulates ready to be conveyed, by dried air (hot air) from the drying container.

According to another embodiment, the first control valve may be coupled between a heating means and with the drying container, which allows conveying by dried and hot air.

Normally, the short pulse of conveying air prevents the dried granulates from sinking down out of the drying container into the conveying conduit. This effect may be improved according to an embodiment of the invention according to which a valve is switched between the discharge end of the drying container and the conveying conduit. Thereby, any escape of conveying air into the drying container is avoided.

According to an embodiment of the apparatus according to the invention, the conveying air is refed in such a way, that an air refeeding conduit is connected to that part of the apparatus from which the air is directed to conveying. Thereby it is assured, that no portion of gas is removed from the closed loop of dried air which otherwise would have to be replaced by moisty air from the atmosphere.

According to an embodiment of the apparatus according to the invention, an input of the second control valve is connected to an air exhaust port of a feeding attachment to the drying container for feeding granulates to be dried to the drying container and for conveying the dried granulates. The feeding attachment is equipped with a feeding conduit from a granulate stock container. The first control valve has an output which may be shut off. Preferably the conveying conduit includes a pocket of variable volume where the discharge conduit from the drying container opens into the conveying conduit.

In yet another improvement of the invention a control means is provided which includes a preset timer. The control means receives control signals from a filling level sensor mounted to a feeding hopper and/or to the drying container. The control means is connected to the first and the second control valves through control signal lines.

The present invention both as to its construction so to its method of operation, together with additional objects and advantages thereof, will be best understood from the following detailed description of the preferred embodiments when read with reference to the accompanying drawings.

DETAILED DESCRIPTION OF PREFERRED EMBODIMENTS OF THE INVENTION

Figure 1:
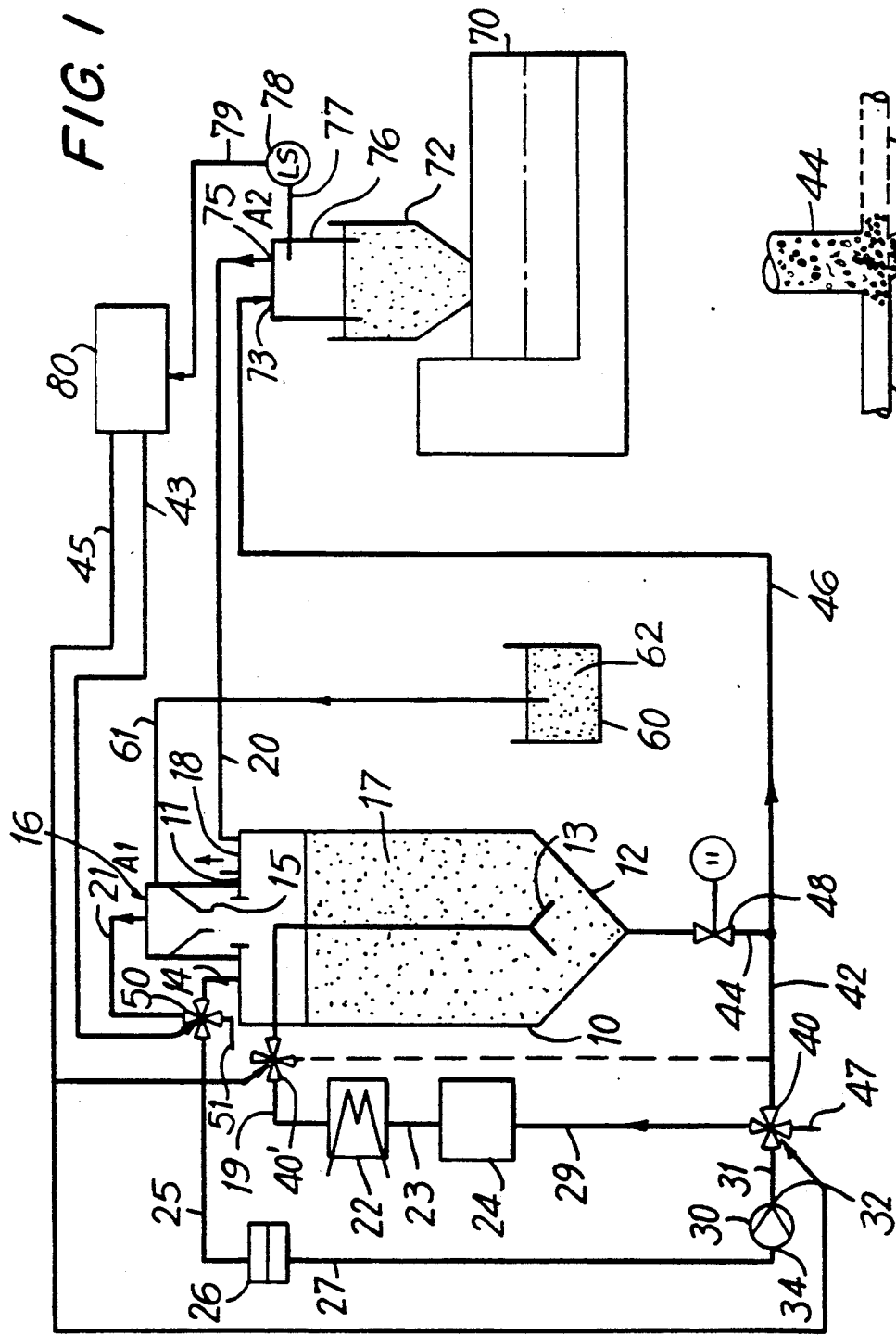
FIG. 1 shows a schematic and simplified diagram of an apparatus for drying and conveying plastic granulates.
Figure 2:
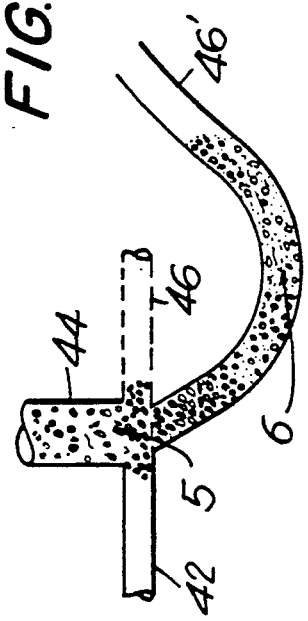
FIG. 2 shows a detail in enlarged scale out of the apparatus according to FIG. 1.

An upright substantially cylindric drying container 10 includes a cover 11 upon which a feeding attachment 16 including an air separator are mounted. Adjacent to the feeding attachment 16, the cover 11 is provided with an exhaust air outlet 14 and a vent 18 which may be shut off.

The lower portion of the drying container 10 terminates in a granulate discharge end 12 to which a discharge valve 48 is connected.

The exhaust air outlet 14 is connected to an input of a second control valve 50 through an air conduit. The downstream output of the second control valve 50 is connected to a filter means 26 through a conduit 25. An air conduit 27 connects the output end of filter 26 to the suction port 34 of a blower 30. The pressure port 32 of blower 30 is connected to the input of a first control valve 40 through an air conduit 31. A first downstream output of the first control valve 40 is connected to a moisture removing device 24 through an air conduit 29. The output of the moisture removing device 24 is connected to a heating means 22 through an air conduit 23. An air conduit 19 connects the output of the heating means 22 to a dried air outlet 13 which is mounted within the interior of the drying container 10 in vicinity of and above the granulate discharge end 12 thereof.

Thereby a closed air flow loop is created from the interior of the drying container 10 through the exhaust air outlet 14 and the second control valve 50 and the filter 26 and the blower 30 and the first control valve 40 and the moisture removing device 24 and the heating means 22 to the dried air outlet 13. The blower 30 recirculates air through said loop.

It may be noted that valve 40' is not provided in the first embodiment of the apparatus according to the invention.

An air conduit 42 connects a second output of the first control valve 40 to a conveying conduit 46 into which a conduit 44 from the output of valve 48 opens. The conveying conduit 46 terminates above a filling-in port 73 of an air separator 76 which is mounted within a feeding hopper 42 of a plastic processing machine 70. The air outlet 75 from the air separator 76 is connected to an opening within cover 11 of the drying container 10 through an air refeeding line 20.

The first control valve 40 is equipped with a vent 47.

A sensing means 77 of a filling level sensor 48 extends into the air separator 76. The filling level sensor emits a control signal to a control means 80 through an output line 79 in the event the sensing means 77 can not detect a sufficiently high filling level of granulates within the feeding hopper 72.

A granulate stock container 60 is provided from which a conduit 61 extends into an opening of the feeding attachment 16. The feeding attachment 16 includes an air separator so that air drawn in through conduit 61 proceeds from the feeding attachment 16 through a conduit 21 to a second input of the second control valve 50.

The second control valve 50 has an input 51 for air from the atmosphere.

Everyone of the first and the second control valves 40, 50 has three throughways for air one of which may be selected electrically by receipt of corresponding control signals from the control means 80. Thus, a first control signal line 45 connects the control means 80 to the first control valve 40, and a second control signal line 43 connects the control means 80 to the second control valve 50. In a first position of the valve member, the second control valve 50 connects the exhaust air outlet 14 to the air conduit 25. In a second position of the valve member the second control valve 50 connects the air input conduit 21 to the air conduit 25. In a third position of the valve member, the second control valve 50 connects the air input 51 to the air conduit 25. In a first position of a valve member, the first control valve 40 connects the pressure port 32 through conduit 31 to air conduit 29. In a second position of the valve member, the first control valve 40 connects the pressure port 32 through conduit 31 to air conduit 42, and in a third position of the valve member the first control valve 40 connects the pressure port 32 through conduit 31 to vent 47.

During operation of the above described apparatus plastic granulates are fed by usual means into the drying container 10. The plastic granulates contained within the drying container 10 are identified by reference numeral 17 in the drawing. The plastic granulates include moisture which is removed as known by means of dried air. For drying the plastic granulates 17 the control means 80 sets the first control valve 40 such that the valve member thereof assumes the first position. Thus, air conduits 31 and 29 communicate, and air conduit 42 and vent 47 are shut off. Moreover, the control means 80 sets the second control valve 50 such that the valve member thereof assumes the first position so that conduits 25 communicates with exhaust air outlet 14, and conduit 21 and 51 are shut off. The operating blower 30 sucks air from the interior of the drying container 10 through the exhaust air outlet 14. The exhaust air passes through conduit 25 and filter 26 (wherein dust particals are removed from the exhaust air). the exhaust air is conveyed by blower 30 through conduits 31 and 29 to the moisture removing device 24. Within this device moisture is removed from the air to such extend, that a dew point of −40° Centigrade, e.g., is obtained.

The dried air emanating from the moisture removing device 24 is pressed through conduit 23 and through heating means 22 wherein it is heated to higher temperatures which, of course, are below the melting point of the plastic granulates 17. The dried air is fed through conduit 19 to the dried air outlet 13 from which it passes through the granulates 17 in counterflow and substantially upward direction towards the exhaust air outlet 14 whereas the plastic granulates simultaneously sink downwards through the drying container to an extend as determined by the discharge of dried granulates through the discharge end 12 of the drying container 10.

The dried plastic granulates are discharged from the drying container 10 and through the open valve 48 into conduit 44 and through the open end thereof into conveying conduit 46. The dried granulates are stored in readiness for being conveyed to the processing machine 70 within space 5 of the conveying conduit 46. In the event, the filling level sensor 78 signals the control means 80 through a control signal on line 79 that the feeding hopper 72 does not contain sufficient granulates, the control means 80 sets the first control valve 40 by a suitable control signal on line 45 into the second position thereof so that conduits 29 and 47 are shut off and conduits 31 and 42 communicate. Thus, exhaust air from the pressure port 32 of the blower 30 proceeds into conduit 42 which opens into conveying conduit 46. The exhaust air pulse drags along the batch of dried granulates stored in space 5 and shifts it through conveying conduit 46 into the air separator 46 and into feeding hopper 72. The second position of the first control valve 40 is maintained by the control means 80 only for a time period of approximately 5 through 10 seconds. Thus, the batch of dried granulates in space 5 is shot pulselike under substantial pressure through the conveying conduit 46 into the feeding hopper 72. Valve 48 is closed during conveyance, so that the conveying air can not escape through conduit 44 into the drying container 10. The portion of the air utilized for conveying is refed through air refeeding line 20 into the closed air flow loop.

When the time period of approximately 5 through 10 seconds has lapsed, the control means 80 sets the first control valve 40 to the first position thereof so that conduits 31 and 29 communicate and conduits 42 und 47 are shut off. Thus, the drying process continues. When the drying process has continued for a time period of approximately 10 minutes, it is interupted by the control means 80 for an intermittent pulslike short time conveyance of the dried granulates stored within space 5 for another period of 5 through 10 seconds. Of course, conduit 29 then is shut off by the first control valve 40 under control of the control means 80. However, conveyance of the batch of dried granulates within space 5 occurs then only if the filling level sensor 78 signals the control means 80 further demand of plastic granulates within feeding hopper 72. In case the feeding level sensor 78 signals no demand no conveying of the batch of dried granulates in space 5 will occur. After the period of 10 seconds has elapsed the drying process will continue for another period of 10 minutes. Thus, the intermittent short time conveying of batches of dried plastic granulates will continue until the filling level sensor 78 indicates to the control means 80 through line 79 that a sufficient filling level of granulates is present in feeding hopper 72. The time periods of 10 minutes and of 5 through 10 seconds, respectively, are determined by not shown preset timers included within the control means 80.

If it is desired to utilize dried air as the conveying medium the apparatus shown in FIG. 1 is modified. The first control valve 40 is removed, so that conduits 31 and 29 are connected directly. A control valve 40' is coupled into conduit 19 downstream the heating means 22. A portion of conduit 42 connected to one of the outputs of control valve 40' is shown in dashed lines. In a first position, the control valve 40' connects the heating means to the dried air outlet. In a second position the control valve 40' connects conduit 42 to the downstream end of the heating means 22, and in a third position control valve 40' connects the downstream end of heating means 22 to a vent. This embodiment of the apparatus is operated in the same way as the first embodiment.

If it is desired to feed granulates to be dried to the drying container 10 from a stock container 60 storing granulates 62 to be dried, conveying of batches of granulates to be dried to the drying container 10 is combined with conveying dried granulates through the conveying conduit as follows:

If a filling level sensor 15 mounted to the drying container 10 signals the control means 80 by means not shown that the drying container 10 has demand for further granulates to be dried, and the filling level sensor 48 signals the control means 80 a demand of dried granulates within feeding hopper 72 the control means 80 sets the first control valve 40 as explained to the second position for a time period of approximately 5 through 10 seconds. Simultaneously, the control means 80 sets the second control valve 50 by a corresponding control signal on line 43 synchroneously with the first control 40 in the second position thereof such that conduit 21 and conduit 25 communicate and the exhaust air outlet 14 and input 51 are shut off. The blower 30 draws air from the granulate stock container 60 which entrains granulates through conduit 61. The granulates are separated from the air within the feeding attachment 16, and the granulates fall into the interior of the drying container 10 through a feeding flap 15 mounted within the cover 11. The air escapes through conduit 21 and the second control valve 50 and through conduit 25, through filter 26 and is drawn in by the blower 30. The pressurized air proceeds through conduits 31, 42 and shoots the dried granulates stored within space 5 through conveying conduit 46 into the filling hopper 42. When the time period of approximately 5 through 10 seconds has elapsed the control means 80 switches the first control valve 40 and the second control valve 50 into the first positions thereof so that the drying process may continue. After a further time period of approximately 10 minutes it is determined whether or not further batches of dried granulates are to be conveyed to filling hopper 72 and further batches of granulates to be dried are to be conveyed to drying container 10. Depending on the result of this determination, the control means 80 causes again conveying of granulates from the stock container 60 into the drying container 10 and simultaneous conveying of a batch of dried granulates through conveying line 46 into the feeding hopper 42.

The conveying medium which may be exhaust air from the drying container 10 or air from the stock container 60 escapes from the feeding hopper 42 into refeeding conduit 20 and is delivered into the upper portion of the drying container and may escape therefrom through the vent 18. Vent 18 is only opened if the blower 30 draws in air from stock container 60. Vent 18, however, is closed in the event exhaust air from the drying container 10 is utilised for conveying a batch of dried granulates through conveying line 46.

In case only the conveying container 10 is to be fed by granulates 62 to be dried but dried granulates from space 5 are not to be conveyed, the control means 80 switches the first control valve 40 in the third position thereof which shuts off conduits 29 and 42 but connects the output 47 to conduit 31.

The control means 80 also switches the second control valve 50 into the second position thereof. In the event only air from the atmosphere are to be utilized for conveying the control means 80 switches the first control valve 40 in the second position thereof and switches the second control valve into the third position thereof wherein conduit 25 is connected only to the air input conduit 51.

The conveying conduit 46 may be formed by a bendable hose which may be bent downwardly downstream to the opening of the conduit 44 into the conveying conduit 46. Therby a pocket 6 is obtained, into which the dried plastic granulates fall from conduit 44 and are kept ready therein for conveying into the feeding hopper 42. The lower the bent is, the greater is the volume of pocket 6 so that the volume of the batch of plastic granulates to be conveyed may be controled by lifting or lowering the conveying conduit 46'.

While the invention has been illustrated and described as embodied in a method of and an apparatus for conveying dried plastic granulates, it is not intended to be limited to the details shown and described, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method for conveying batches of plastic granulates, comprising the steps of feeding plastic granulates into a drying container; heating the plastic granulates within the drying container by hot gas in counterflow to the granulates and drying the granulates; allowing the flow of drying gas to be intermittently intercepted for short time periods upon demands for conveying batches of plastic granulates; and conveying a batch of plastic granulates during an interruption by a conveying medium.

2. Method according to claim 1 wherein said feeding step includes conveying batches of plastic granulates from a stock of plastic granulates to be dried into the drying container during the interruptions.

3. Method according to claim 1 wherein the number of interruptions is controlled by the filling level of the drying container.

4. Method according to claim 1 wherein air is utilized as the conveying medium.

5. An apparatus for conveying dried plastic granulates, comprising a drying container having a granulate discharge end, an exhaust air outlet opposite to the granulate discharge end, and a hot air outlet in its interior adjacent to the granulate discharge end; a blower having a suction port coupled to the exhaust air outlet and a pressure port coupled to the hot air outlet through a heating means; a first control valve coupled to the pressure port, to the heating means, and to a conveying conduit; a discharge conduit connecting the granulate discharge end and a conveying conduit; and a second control valve coupled to the suction port of the blower and to the exhaust air outlet, the second control valve including an input adapted to be shut off.

6. Apparatus according to claim 5 wherein the first control valve includes an outlet adapted to be shut off, the second control valve being coupled to an exhaust air outlet of a feeding attachment of the drying container, said apparatus further comprising a conduit connecting the drying container and a granulate stock container.

7. Apparatus according to claim 5 wherein the conveying conduit is coupled to a feeding hopper of a plastic processing machine.

8. An apparatus according to claim 5, further comprising a valve for connecting the granulate discharge end to the conveying conduit through.

9. An apparatus according to claim 5, further comprising an air refeeding conduit for coupling a feeding hopper to the drying container.

10. An apparatus according to claim 5, further comprising a control means including a first preset timer and a filling level sensor mounted to a feeding hopper, said control means receiving control signals from said filling level sensor and being connected to the first control valve and to the second control valve through control signal lines.

11. An apparatus according to claim 15, comprising a second filling level detector mounted to the drying container to apply control signals which indicates a filling level of the drying container, to said control means.

12. An apparatus according to claim 5, further comprising a moisture removing device for drying the exhaust air and coupled between the first control valve and the heating means.

13. An apparatus according to claim 5 wherein the conveying conduit includes a pocket adjacent to the opening of the discharge conduit, volume of the pocket being variable.

14. An apparatus according to claim 13 wherein the pocket is formed by a bent of a hose.

15. A method for conveying batches of plastic granulates comprising the steps of feeding plastic granulates into a drying container; heating the plastic granulates within the drying container by hot gas in counterflow to the granulates and drying the granulates; intermittently interrupting the flow of drying gas for short time periods; conveying dried plastic granulates during the interruptions; at least one partially filtering and heating the exhaust gas emanating from the drying container and refeeding it to the drying container, the exhaust gas being utilized for conveying plastic granulates during the interruptions.

16. A method for conveying batches of plastic granulates, comprising the steps of feeding plastic granulates into a drying container; heating the plastic granulates within the drying container by hot gas in counterflow to the granulates and drying the granulates; allowing the flow of drying gas to be intermittently intercepted for short time periods upon demands for conveying batches of plastic granulates; and conveying a batch of plastic granulates during an interruption, said conveying step including conveying batches of dried plastic granulates from the drying container into a feeding hopper of a plastic processing machine during the interruptions.

17. A method for conveying batches of plastic granulates, comprising the steps of feeding plastic granulates into a drying container; heating the plastic granulates within the drying container by hot gas in counterflow to the granulates and drying the granulates; allowing the flow of drying gas to be intermittently intercepted for short time periods upon demands for conveying batches of plastic granulates; conveying a batch of plastic granulates during an interruption; drying and heating the exhaust air from the drying container outside the drying container and refeeding it to the drying container; and utilizing the exhaust air for conveying the dried plastic granulates from a discharge end of the drying container into a feeding hopper of a plastic processing machine during the interruptions of a drying process.

18. A method for conveying batches of plastic granulates, comprising the steps of feeding plastic granulates into a drying container; heating the plastic granulates within the drying container by hot gas in counterflow to the granulates and drying the granulates; allowing the flow of drying gas to be intermittently intercepted for short time periods upon demands for conveying batches of plastic granulates; and conveying a batch of plastic granulates during an interruption, the number of interruptions being controlled by the filling level within a feeding hopper.

19. A method for conveying batches of plastic granulates, comprising the steps of feeding plastic granulates into a drying container; heating the plastic granulates within the drying container by hot gas in counterflow to the granulates and drying the granulates; allowing the flow of drying gas to be intermittently intercepted for short time periods upon demands for conveying batches of plastic granulates; and conveying a batch of plastic granulates during an interruption, dried granules being kept ready for conveying during an interruption of the drying process within a space the volume of which may be varied.

* * * * *